3,159,616
NOVEL SALT OF HYDROXOCOBALAMINE
Gérard Nomine, Noisy-le-Sec, Lucien Penasse, Paris, and Pierre Barthelemy, Clichy-sous-Bois, France, assignors to Roussel-UCLAF, S.A., Paris, France, a corporation of France
No Drawing. Filed July 9, 1963, Ser. No. 293,877
Claims priority, application France, July 11, 1962, 903,666; Oct. 11, 1962, 911,956
1 Claim. (Cl. 260—211.5)

The invention relates to a novel salt of hydroxocobalamine, namely the hydro-iodide of hydroxocobalamine and to a novel process for its preparation. The invention further relates to novel compositions for the treatment of anemia and to a novel method of treating anemia.

Hydroxocobalamine is known to be a very unstable product in the solid state and will begin to decompose at room temperatures after only a few weeks. The rate of degradation frequently reaches the order of 10% per month and this instability of hydroxocobalamine has posed serious problems. The instability is not a function of the purity of the product since even the most pure products decompose as rapidly as samples of ordinary purity. Certain mineral and organic acid salts of hydroxocobalamine, such as the chloride, sulfate and acetate are known but these do not overcome the instability problem because the salts are not stable or have a lower order of activity than hydroxocobalamine.

It is an object of the invention to provide the novel hydro-iodide salt of hydroxocobalamine which has a high degree of stability.

It is another object of the invention to provide a novel process for the preparation of the hydro-iodide salt of hydroxocobalamine.

It is a further object of the invention to provide novel compositions for the treatment of anemia.

It is an additional object of the invention to provide a novel method of treating anemia.

These and other objects and advantages of the invention will become obvious from the following detailed description.

The novel salt of hydroxocobalamine of the invention is the hydro-iodide salt of hydroxocobalamine. The said hydro-iodide salt possesses a remarkable resistance to heat and to chemical oxidation as compared to known salts, such as the acetate of hydroxocobalamine and is, therefore, suitable for storing hydroxocobalamine for prolonged periods of time. The hydro-iodide salt can be used per se or it can be converted to free hydroxocobalamine or other salts thereof by known procedures.

The process for the preparation of the hydro-iodide of hydroxocobalamine comprises reacting hydro-iodic acid with an aqueous solution of a product selected from the group consisting of hydroxocobalamine and weak acid salts thereof in the absence or presence of an additional solvent, precipitating the hydro-iodide of hydroxocobalamine by adding an oxygenated, water-miscible solvent to the aqueous solution and recovering the hydro-iodide of hydroxocobalamine.

The starting aqueous solutions should contain 0.5 to 5.0% of hydroxocobalamine or the weak acid salt and preferably between 1 to 2% when the weak acid salt is used. It is also preferred to add a small amount of the oxygenated, water-miscible solvent, such as acetone or dioxane to the aqueous solution at the beginning of the reaction. The hydro-iodic acid is preferably used in a large excess of about 10 to 15 times the theoretical amount.

The hydro-iodide possesses interesting vitamin properties, particularly a preventative or curative action with reference to Biermer anemia or hyperchrome megaloblastic anemia, hypochrome ferri-deficient anemia or post-infectious anemias as well as a neurotrophic action and general stimulating action. It is useful for the treatment of the said anemias, of neuro-anemic syndromes, in nervous complications of Biermer anemias, of motor disturbances, of disturbances of the depth sensitivity, of alcoholic polynevritis, of retrobulbairy optic nevritis, of peripheric neuropathy, of neurological manifestations of diabetis, and of various neurological syndromes such as sclerosis in spots.

The novel compositions of the invention for treating anemia are comprised of the hydro-iodide of hydroxocobalamine and a major amount of a pharmacological carrier. The compositions can be prepared in the form of drinkable or injectable solutions, prepared in ampules, in multiple-dose flacons, syringes ready for injection, in the form of tablets and of sugar coated tablets by known procedures.

The novel method of the invention for the treatment of anemia comprises administering an effective amount of the hydro-iodide of hydroxocobalamine to the subject. The useful dosage is 0.1 to 2.0 mg. per dose in the adult depending upon the method of administration. The said hydro-iodide can be administered orally or transcutaneously.

In the following examples there are described several preferred embodiment to illustrate the invention. However, it should be understood that the invention is not intended to be limited to the specific embodiments.

EXAMPLE I

*Preparation of the Hydro-Iodide of Hydroxocobalamine by Salt Formation From the Free Base*

To 333 cc. of a water-acetone solution containing 0.5 gm. of hydroxocobalamine, 67 cc. of water and 265 cc. of acetone, cooled to 0° C., 1.13 gm. of a solution of hydro-iodic acid (density=1.7) and then 400 cc. of acetone were added. The reaction mixture was allowed to stand in a refrigerator for a period of 24 hours. The crystals formed were vacuum filtered, washed with acetone and dried to obtain 419 mg. of the hydro-iodide of hydroxocobalamine.

The product obtained occurred in the form of very deep red crystals, darker than the hydroxocobalamine free base and was soluble in water, alcohol and dilute aqueous acids and insoluble in acetone, ether, benzene and chloroform. The crystals were solvated and contained 5.5% solvent and the spectral analysis showed that they contained 93.8% of hydroxocobalamine and 8.8% (theoretical—8.6%) of iodine. U.V. Spectra (in the sodium acetate buffered solution, pH=4.5):

$$\lambda \text{ max. } 274 \text{ m}\mu \text{ } E_{1\text{ cm.}}^{1\%} = 128$$
$$357 \text{ m}\mu \text{ } E_{1\text{ cm.}}^{1\%} = 183$$
$$525 \text{ m}\mu \text{ } E_{1\text{ cm.}}^{1\%} = 65$$

*Potentiometric titration.*—6.62 equivalents$\times 10^{-4}$/gm. (theoretical 6.78$\times 10^{-4}$).

EXAMPLE II

Preparation of the Hydro-Iodide of Hydroxocobalamine Starting From the Acetate Salt 4.91 gm. of the acetate of hydroxocobalamine containing 4.34 gm. of pure hydroxocobalamine were dissolved in a half liter of water and a liter and a half of anhydrous acetone were added thereto. While cooling to 0° C., first 7 cc. of hydro-iodic acid (density=1.7) and then 2.5 liters of anhydrous acetone were added. The reaction mixture was allowed to stand overnight at 0° C. and the product formed was vacuum filtered, washed with acetone and dried to obtain 3.79 gm. of the hydro-iodide of hydroxocobalamine. The solvated product contained 5.9% of solvent and the spectrophotometric and bacteriological analysis (920 γ/mg.) confirmed a purity of 100%.

Comparative Stability of Different Salts of Hydroxocobalamine

For the comparative study, the products to be tested were introduced into 2 cc. ampules at a level of 40 mg. of product per ampule. The ampules were sealed under air and heated in an oven to 80° C. For analysis, one ampule of each salt was taken after two and seven days and the solvatation and spectrophotometric titration was determined. The results obtained are resumed in Table I.

| Salt | Initial Value[1] | Percent Lost in 2 Days | Percent Lost in 7 Days |
|---|---|---|---|
| Chloride | 915 | 5.0 | 10.0 |
| Gentisate | 920 | 14.0 | 17.5 |
| Acetate | 960 | | 77.0 |
| Salicylate | 880 | 4.5 | 19.0 |
| Iodide | 920 | 2.5 | 2.5 |

[1] Expressed in γ of hydroxocobalamine per mg. of dry salt.

It can be easily seen from Table I that the hydro-iodide salt of hydroxocobalamine is much more stable than the known acid salts of hydroxocobalamine since the rate of degradation is so much lower.

Comparison of Vitaminic Activities of the Different Salts of Hydroxocobalamine After Maintenance in the Oven at 80° C.

The initial vitaminic activity after holding in the oven at 80° C. for a period of two and seven days of the different salts of hydroxocobalamine was determined. The holding in the oven was effected on samples of different solvated salts of which the value of solvatation was determined just at the moment of placing them in ampule. The samples were taken from sealed ampules. The vitaminic activity was determined by the test of growth of cultures of Lactobacillus Leichmanni (ATCC 7830). The evaluation was made by the turbidimetric method in comparison with the results obtained with solutions of vitamin $B_{12}$ of known concentration. The results obtained are summarized in Table II.

TABLE II

| Salt of Hydroxocobalamine | Test of Initial Vitamin Activity, γ/mg. | After 2 days at 80° C. | | After 7 days at 80° C. | |
|---|---|---|---|---|---|
| | | Test of Vitamin Activity, γ/mg. | Percent Lost | Test of Vitamin Activity, γ/mg. | Percent Lost |
| Acetate | 900 | 735 | 18.0 | 690 | 24.0 |
| Salicylate | 955 | 720 | 24.6 | 670 | 30.0 |
| Hydro-iodide | 925 | 826 | 10.7 | 760 | 17.8 |

The loss of vitaminic activity is less with the hydro-iodide salt of hydroxocobalamine than with the known salts. The percent of activity lost is negligible after two days at 80° C. and is greatly reduced after seven days at 80° C. as compared to the known salts.

Determination of Toxicity

The degree of toxicity was determined on groups of 10 mice of the Rockland strain weighing between 18 and 22 gm. each. Aqueous solutions of the hydro-iodide salt of hydroxocobalamine were injected intravenously into the groups of mice at doses of 200 mg./kg., 300 mg./kg. and 400 mg./kg., respectively. The animals were then placed under observation for a week and then the following observations were made:

At the considerable dose of 200 mg./kg.—no indications of mortality or symptoms of toxicity were observed.
At the dose of 300 mg./kg.—2 animals had died
At the dose of 400 mg./kg.—7 animals had died The average ethal dose ($DL_{50}$) of the hydro-iodide of hydroxocobalamine administered intravenously is 360 mg./kg.

Various modifications of the compositions and process of the invention may be made without departing from the spirit or scope thereof and it is to be understood that the invention is intended to be limited only as defined in the appended claims.

We claim:
The hydro-iodide of hydroxocobalamine.

References Cited by the Examiner

UNITED STATES PATENTS

| | | | |
|---|---|---|---|
| 2,842,540 | 7/58 | Perlman | 260—211.5 |
| 2,939,821 | 6/60 | Freedman et al. | 167—81 |
| 3,060,095 | 10/62 | Stolar | 167—81 |
| 3,062,723 | 11/62 | Dobry et al. | 260—211.5 |
| 3,115,489 | 12/63 | Cords et al. | 260—211.5 |
| 3,120,509 | 2/64 | Bernhauer et al. | 260—211.5 |

OTHER REFERENCES

Ungley: Vitamins and Hormones, vol. 13, page 201, 1955.

LEWIS GOTTS, *Primary Examiner.*

FRANK CACCIAPAGLIA, JR., *Examiner.*